(12) United States Patent
Stephens et al.

(10) Patent No.: US 6,323,782 B1
(45) Date of Patent: Nov. 27, 2001

(54) UNATTENDED ITEM DELIVERY SYSTEM

(75) Inventors: Sandra K. Stephens; Robert E. Zack, both of Dana Point, CA (US)

(73) Assignee: Freight Locker, Inc., Dana Point, CA (US)

( * ) Notice: Subject to any disclaimer, the term of this patent is extended or adjusted under 35 U.S.C. 154(b) by 0 days.

(21) Appl. No.: 09/334,509

(22) Filed: Jun. 21, 1999

(51) Int. Cl.[7] .................................................. G06F 7/04
(52) U.S. Cl. .............................. 340/825.31; 340/10.31; 342/457
(58) Field of Search ..................... 340/5.5, 5.61, 340/5.62, 5.63, 5.73, 5.9, 426, 5.74, 10.1, 10.31, 10.5; 342/457

(56) References Cited

U.S. PATENT DOCUMENTS

| | | |
|---|---|---|
| 551,696 | 12/1895 | Stockwell . |
| 888,052 | 5/1908 | Vaughan et al. . |
| 1,754,911 | 4/1930 | Sherwood et al. . |
| 2,597,782 | 5/1952 | Ferm ..................................... 312/283 |
| 3,837,300 | 9/1974 | Karr ....................................... 109/57 |

(List continued on next page.)

OTHER PUBLICATIONS

Strattec Security Corporation, *Introducing the New Wave in Driver Efficiency and Security*, 1 page.
Motorola, Inc., *Bistatix Press Release*, 3 pages.
Chris Anderson, *Breakthrough RFID "Smartlabel" Technology Unveiled by Motorola*, 1 page.
Texas Instruments, *Tag–It—The New World of Electronic Smart Labels Arrives at Scan–Tech '98*, 4 pages.
Texas Instruments, *Tag–it Inlays Product Bulletin*, 1 page.
Texas Instruments, *TIRIS Technology by Texas Instruments Specification Sheet*, 1 page.
Texas Instruments, *Tag–it—The New World of Smart Labels*, 8 pages.
Philips Semiconductors, *I–Code*; 4 pages.
Philips Semiconductors, *I–Code*, 12 pages.
Hornet Auto Security Systems, *Put the Stink on Crime*, 5 pages.
Intellikey Corporation, *Intellikey Genius at your Fingertips*, 8 pages.
Mors Technologies, Inc., *LOGIBAG The "New Generation" Left Luggage Locker*, 4 pages.
American Locker Security Systems, *Security American Locker*, 12 pages.

(List continued on next page.)

*Primary Examiner*—Michael Horabik
*Assistant Examiner*—M Shimizu
(74) *Attorney, Agent, or Firm*—Stetina Brunda Garred & Brucker (57) ABSTRACT

In accordance with the present invention, there is provided a controlled access storage system for the delivery and retrieval of an item having a transponder associated therewith. In this regard, the transponder is programmed with data specific to the item. The transponder is configured to transmit item identification data. The storage system is provided with an enclosure sized and configured to store the item. The storage system is further provided with a locking mechanism for unlocking the enclosure for access therein in response to an unlock signal. The storage system is further provided with a transponder communications device which is configured to electrically interrogate the transponder and to receive the item identification data in response. The storage system is further provided with access control circuitry which is disposed in operable communication with the transponder communications device and the locking mechanism, for selectively providing an unlock signal to the locking mechanism in response to the received item identification data.

67 Claims, 4 Drawing Sheets

U.S. PATENT DOCUMENTS

| | | | |
|---|---|---|---|
| 4,557,201 | 12/1985 | Webb, Jr. ................................ | 109/45 |
| 4,636,950 | 1/1987 | Caswell et al. . | |
| 4,897,630 * | 1/1990 | Nykerk ................................ | 340/426 |
| 5,346,297 * | 9/1994 | Colson, Jr. et al. ................ | 312/215 |
| 5,488,914 | 2/1996 | Ouelette ................................ | 109/56 |
| 5,612,683 | 3/1997 | Trempala et al. ............... | 340/825.31 |
| 5,648,765 | 7/1997 | Cresap et al. . | |
| 5,686,902 * | 11/1997 | Reis et al. ........................ | 340/825.54 |
| 5,729,198 | 3/1998 | Gorman ............................. | 340/539 |
| 5,774,053 | 6/1998 | Porter ................................ | 340/568 |
| 5,815,114 | 9/1998 | Speasl et al. . | |
| 5,861,817 * | 1/1999 | Palmer et al. ................... | 344/825.35 |
| 5,933,090 * | 8/1999 | Christenson .................... | 340/825.69 |

OTHER PUBLICATIONS

American Locker Security Systems, *Compu–Lok*, 6 pages.

Supra, *Unattended Delivery Profile*, 5 pages.

Supra, *TRACcess Overview*, 14 pages.

dVault, Inc., *The Safe, Secure and Private Package Delivery Box*, 6 pages.

Microchip Technology, Inc., *Welcome to Planet Microchip*, 11 pages.

Checkpoint Systems, Inc., *Checkpoint (webpage)*, 4 pages.

* cited by examiner

UNATTENDED ITEM DELIVERY SYSTEM

FIELD OF THE INVENTION

The present invention relates generally to item delivery systems, and more particularly to an enclosure having controlled access thereto.

BACKGROUND OF THE INVENTION

Improvements in the delivery process of items, packages, and transportable goods in general is a topic of attention. In particular, enhancing the quality of security regarding the delivery process is highly desirable.

In order to better understand the advantages of the present invention, a simplified discussion of a typical delivery process is useful. Those involved in the delivery process of an item may commonly fall within three functional groups with respect to one another. These are the receivers, senders and delivery personnel. The receiver may include those who are intended or are expecting to receive an item to be delivered. In the consumer context for example, the receiver may be a customer who initiates the delivery process by placing a product order with a sender. Thus, the sender may be a manufacturer, vendor, seller, or distributor of the item, for example. In response to such product order, the sender may enlist the services of delivery personnel (e.g., couriers, shippers, postal service). It is contemplated that the sender may also function as delivery personnel as well. Thus, it is understood that anyone may function as a receiver, sender and delivery personnel with respect to one another.

As a convenience to all involved, the secure unattended delivery of an item to a receiver is highly desirable. In this respect, various delivery arrangements have been developed to facilitate the drop-off of an item by delivery personnel to a location without the receiver being present to physically take possession of the item. For example, the receiver may have a lockable enclosure or safe located at its business, home or other pick-up location. The delivery personnel is provided with a means for accessing the lockable enclosure which, of course, will vary upon the type of locking mechanism utilized. For example, the enclosure may be protected by a padlock with an associated mechanical key. Another exemplary arrangement may include the provision of an alpha numeric key pad which is used by the delivery personal to enter an access code. Such a prior art arrangement is disclosed in U.S. Pat. No. 5,774,053 to Porter. Yet another arrangement may include an active radio frequency device which is similar to a car alarm remote, which not only deactivates a car alarm but also triggers she unlocking of automatic door locks.

Subsequent to the delivery of the item by the delivery personnel, the receiver may access the lockable enclosure to pick-up or retrieve the delivered item. Such an unattended delivery system conveniently allows for delivery personnel to drop-off an item at any time, even after normal operating hours. Furthermore, the receiver may retrieve the item at their leisure.

Various prior art attempts have been made to enhance the security of the above described delivery process. The security of such a prior art delivery process is potentially susceptible to the fact that the delivery personnel must be provided with the means by which to access the receiver's enclosure. Thus, the delivery personnel must be given a mechanical key, active remote (such as a button transmitter), access code, combination, etc. (figuratively referred to as the "key"), which unlocks the enclosure. Once the receiver turns over its "key" to the delivery personnel, however, the security of their enclosure becomes dependent upon, and therefore susceptible to, the security procedures of the delivery personnel. The concern is that by giving the "key" to the delivery personnel, the enclosure may be subject to unauthorized access (i.e., when not associated with the delivery or drop-off of an item). In addition, there are issues as to whether the "key" may be duplicated, and procedures when a "key" has been "lost" by delivery personnel.

Moreover, the requirement that a "key" be given to the delivery personnel may be logistically cumbersome. This is because regular delivery personnel will typically be required to be enlisted by the receiver prior to the initiation of the delivery process. Thus, the sender may be restricted in its usage of its own preferred delivery personnel and may have to use and coordinate with the regular delivery personnel of the receiver.

It is therefore evident that there exists a need in the art for an improved method and system for the delivery of items which mitigates the security susceptibility resulting from a requirement that delivery personnel be provided with a "key" to access an item storage enclosure.

SUMMARY OF THE INVENTION

In accordance with the present invention, there is provided a controlled access storage system for the delivery and retrieval of an item having a transponder associated therewith. The transponder is configured to transmit item identification data. In this regard, the transponder is programmed with data specific to the item and its destination. The storage system is provided with an enclosure which is sized and configured to store the item. The storage system is further provided with locking mechanism for unlocking the enclosure for access therein in response to an unlock signal. The storage system is further provided with a transponder communications device which is configured to electrically interrogate the transponder and to receive the item identification data in response. The storage system is further provided with access control circuitry which is disposed in operable communication with the transponder communications device and the locking mechanism, for selectively providing an unlock signal to the locking mechanism in response to the received item identification data.

It is contemplated that once an item is "tagged" with its own specifically programmed transponder, the item itself provides the key to unlocking the enclosure by merely being transported adjacent to the enclosure so as to facilitate the transmission and receipt of the item identification data by the transponder communications device. In the preferred embodiment of the present invention, the transponder is a passive radio frequency device which is integrated with an adhesive label. Advantageously, such a label may be readily attachable to the item to be delivered.

Preferably, the storage system is provided with an external communications device which is in electrical communication with the access control circuitry. The external communications device is configured to establish a data link with an external host computer. In this respect, it is contemplated that the status of the enclosure and any items delivered thereto may be reported to the external host computer. The external communications device may take the form of a modem, cellular phone, radio frequency transmitter/receiver or other electronic device. In this respect, the external communications device may be configured to transmit a signal representative of the event that a particular item has been delivered to the enclosure as identified by the item's own specific item identification data.

It is contemplated that the data link with the external host computer may be two-way and that signals may be passed to the access control circuitry. As such, signals may be also transmitted to the access control circuitry for remotely unlocking the enclosure. Further, as the transponder may be programmed, the host computer may send signals which may then be used to update the item identification data contained within the transponder.

The access control circuitry has selection criteria data stored therein. The access control circuitry selectively provides the unlock signal in response to comparison of the selection criteria data to the item identification data. Thus, when a particular item with its attached transponder is brought to the enclosure, the transponder communications device receives the item identification data and compares it to the selection criteria data. In this regard, the enclosure may be primed to expect the delivery of a particular item thereat. Alternatively, upon receipt of the item identification data, the external communications device may query the host computer, via the data link, as to whether the enclosure should be unlocked for such item. Preferably, the external host computer is in communication with a global computer network (e.g., the Internet). In this respect, any status information which is reported to the external host computer regarding the enclosure and any items delivered thereto may be made accessible to the sender or the expecting receiver of the item.

Further, in a preferred embodiment of the present invention, the storage system is provided with a self contained power supply which is disposed in operable communication with the access control circuitry. The power supply may be a solar powered device, a rechargeable battery operated device, a manual powered device, or even combinations thereof. The self contained power supply may act as a back up to a traditional electrical power line, or as a sole source where electrical power lines are not available, such as in remote areas. As an added security feature, power interruption circuitry may be provided which is in electrical communication with the access control circuitry for sensing an interruption of power to the access control circuits and for generating a signal representative of sensed power interruption. The external communications device may be configured to transmit such signal to th external host computer.

The enclosure may be equipped with tamper sensors for sensing a tamper event (e.g., unauthorized opening of a door to the enclosure, substantial movement of the enclosure). The external communications device may be configured to transmit an alarm signal to the external host computer in response to any sensed tamper event. Additionally, the enclosure may be provided with various output devices, i.e., flashing lights or sirens, which are also triggered in response to such a tamper event. The enclosure may be further equipped with a camera which is sized and configured to capture an image adjacent the enclosure. The camera may generate an image signal representative of the captured image, and the external communications device may transmit the image signal to the external host computer. Thus, the camera may be configured to capture images of anyone involved in a tamper event as mentioned above. Further, the camera may be useful in documenting the particular individual who may have delivered the item, as well as, confirming that the item was indeed delivered. As a further security feature, a global positioning satellite (GPS) positioning signal receiver may be attached to the enclosure, and the external communications device may be configured to transmit locational data based upon a received GPS positioning signal to the external host computer. Thus, in the contingency where the enclosure is stolen, the (GPS) positioning signal receiver provides a means for tracking the location of the enclosure and any of the valuable items stored therein.

A secondary transponder communications device may be disposed in electrical communication with the access control circuitry. The secondary transponder communications device is configured to electrically sense the transponder being within the enclosure, and the access control circuitry generates a confirmation signal in response to the sensed presence of the transponder. The confirmation signal may be transmitted to the external host computer via the external communications device.

Furthermore, the enclosure may be provided with environmental controls for modifying the environment within the enclosure, such as temperature, humidity and lighting. This may be of particular importance where the items are, for example, hot foods, dairy products, fresh flowers, produce, live animals, etc.

The enclosure may be provided with wheels and configured to engage a docking bay. In addition, the enclosure may be modular in nature. In this respect, the enclosure may be formed of multiple interlocking panels. Moreover, the enclosure may be formed to engage other such enclosures to form a grouping of such enclosures.

Where an item is desired to be securely delivered from a "sender" to a "receiver," the above described storage system facilitates a method of securely delivering such item. The delivery method initially provides for attaching the transponder which is programmed with the item identification data to the item. The transponder tagged item is transported in close proximity to the enclosure. A transponder data link is established between the transponder communications device located at the enclosure and the transponder. The transponder is electrically interrogated and the item identification data is received in response via the transponder data link. The enclosure is selectively unlocked based upon the received item identification data. Upon the occurrence of the unlocking of the enclosure a receipt signal is generated. A host computer data link is established between the external host computer and the external communications device located at the enclosure. A receipt signal is transmitted to the host computer via the host computer data link. A notification communication may be issued from the host computer in response to the receipt signal. Thus, the expecting receiver may be notified that the item has been delivered and is ready to be retrieved. In addition, once the transponder tagged item is retrieved from the enclosure, such removal of the item may be sensed by the transponder communications device and a signal may be sent to the host computer in response. Thereafter, a confirmation communication may be issued to the sender which confirms that indeed the item has been retrieved.

As such, based on the foregoing, the present invention mitigates the inefficiencies and limitations associated with the prior art. Importantly, the present invention avoids the requirement that delivery personnel be provided with the "key" to unlocking the receiver's enclosure, as discussed above. This is because once the item is tagged with its own specifically programmed transponder, the item itself provides the means by which the enclosure is unlocked.

In addition, because the access to the enclosure is controlled by the transponder tagged item, logistical problems and limitations associated with the receiver providing delivery personnel with a means to access the enclosure are eliminated. As such, the present invention facilitates the convenience utilization of any delivery personnel.

Significantly, the storage system of the preferred embodiment of the present invention may be configured to communicate with an external host computer. As such, information regarding the status of the enclosure may be rapidly accessed or provided. Thus, the sender and receiver may be notified soon after the delivery personnel has dropped off an item at the enclosure. Further, the sender and delivery personnel may be provided with a confirmation that the receiver has picked-up the item.

Moreover, the present invention may incorporate a variety of complementary security features. As mentioned above the storage system may be advantageously provided with tamper sensors, external and internal cameras, power interruption circuitry, GPS tracking ability, and a sensor for detecting the internal presence of a delivered item (i.e., the secondary transponder communications device).

Further, the storage system may be configured to operate in a stand alone arrangement. In this regard, the external communications device may be a remote one and there may be provided an independent power source. Thus, operation of the enclosure may be configured to be independent of fixed or hardwired communications or power lines.

As such, the storage system of the present invention facilitates an enhanced degree of secure item delivery. Accordingly, the present invention represents a significant advancement in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Referring now to the drawings wherein the showings are for purposes of illustrating a preferred embodiment of the present invention only, and not for purposes of limiting the same, FIGS. 1–6 illustrate a controlled access storage system for facilitating the secure delivery and retrieval of an item 10 into and out of a lockable enclosure 12.

Figure 1:
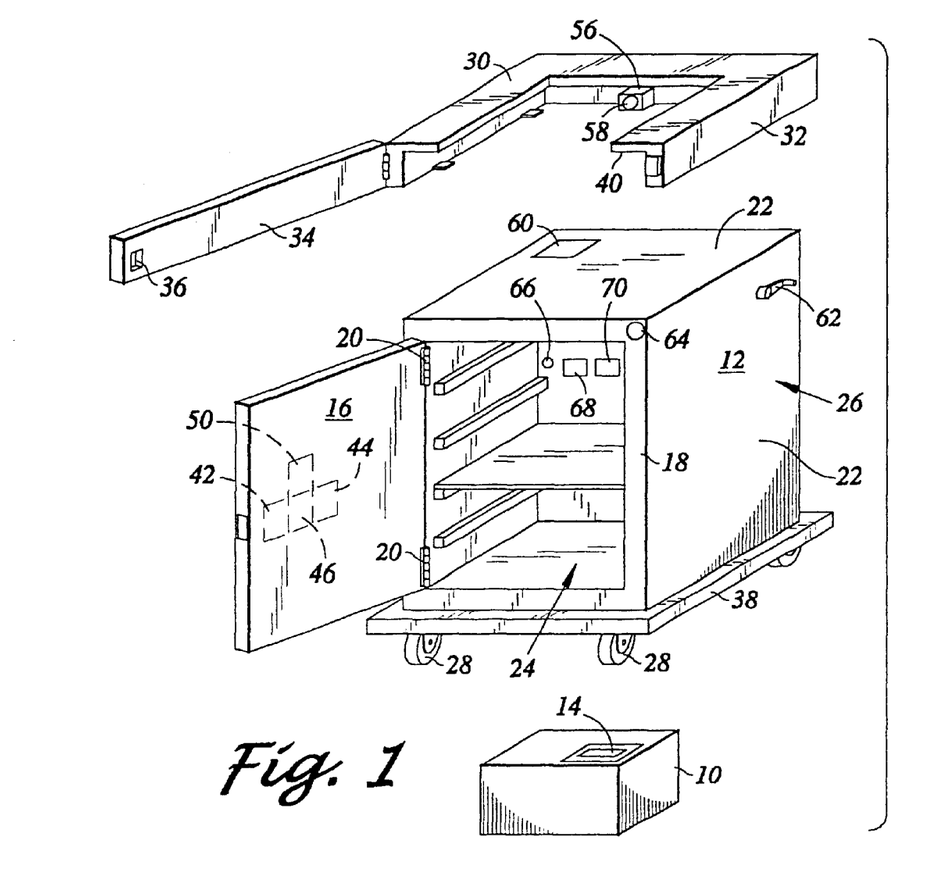
FIG. 1 depicts the controlled access storage system of the present invention including an item to be delivered in an enclosure and its docking bay.

Referring now to FIG. 1, in accordance with the present invention, the item 10 to be delivered is provided with a transponder 14 associated therewith. The transponder 14 is configured to transmit item identification data. In the preferred embodiment of the present invention, the transponder 14 includes programmable integrated circuitry which is disposed in electrical communication with an antenna. The integrated circuity includes a resonant capacitor arrangement. As one of ordinary skill in the art will appreciate, such an arrangement circumvents the need to provide the transponder 14 with an independent power source (e.g., a battery). This is because the resonant capacitor arrangement allows the transponder 14 to collect energy of a radio frequency field to which it is exposed. In this respect the transponder 14 is passive.

The programmable integrated circuitry has a memory which stores the item identification data. Advantageously, the transponder 14 may be integrated with a label. The transponder 14 may be fabricated by printing conductive non-metallic ink onto a substrate, such as adhesive paper or other non-conductive material. In this form, such transponders 14 are known in the industry as "smart labels." Examples of such label integrated transponders 14 are commercially available under the product names, I.CODE label IC (manufactured by Philips Semiconductors), Tag-it™ Inlays (manufactured by Texas Instruments Incorporated, microID™ FDID Tags (manufactured by Microchip Technology, Inc.), and BiStatix* (manufactured by Motorola, Inc.). As such, the item 10 is "tagged" with the transponder 14. Rather than adhering a transponder 14 integrated with a label onto the item 10, the transponder 14 may simply be placed within the item 10. For example, where the item 10 takes the form of a box containing goods, the transponder 14 may be put within the box. Alternatively, the transponder 14 may be fabricated by printing conductive non-metallic ink directly onto the item 10 to be delivered.

As mentioned above, the storage system of the present invention facilitates the secure delivery and retrieval of the item 10 into and out of the enclosure 12. The enclosure 12 is sized and configured to store the item 10 therewithin. Thus, the size and shape of the enclosure 12 is determined by the expected sized, shape and quantity of the items 10 to be delivered. In this respect, the item 10 may take the size and form of a letter or package, and the enclosure 12 may take the size and form of a mail box. It is contemplated that the item 10 may be of any size, shape or configuration. Thus, for example, the item 10 may be a patient who is transported and tracked within a hospital, and the enclosure 12 may be the patient's room. As another example, the item 10 may be an inmate in a low security facility, the transponder 14 may be integrated with a wristband, and the enclosure 12 may be the inmate's room or work area. In this regard, it is understood that the item 10 and enclosure 12 depicted in the figures are symbolic in nature for illustrating the present invention.

In the preferred embodiment, the enclosure 12 is provided with at least one door 16 which is formed to engage a door frame 18 thereof. The door 16 is rotatably attached to the door frame 18 by a door hinge 20. The enclosure 12 is formed of multiple panels 22 which along with the door 16 define an interior 24 and exterior 26 of the enclosure 12. The door 16, door frame 18 and panels 22 are formed of those materials which are well known to one of ordinary skill in the art, such as high strength plastic or metal. An appropriate material selection, however, will depend upon the items 10 anticipated to be securely delivered and stored in the interior 24 of the enclosure 12. For example, where the items 10 are letters and small packages, high strength plastic or metal may be appropriate. Where the items 10 include hot or cold foods, an airtight insulated material may be further specified. However, where the items 10 are livestock, the panels 2 and door 16 may be more appropriately constructed of tubular metal grating.

In one embodiment of the present invention, the panels 22 and door frame 18 are formed to releasably engage or interlock one another. Advantageously, where the size or shape of the enclosure 12 is required to be modified, such interlocking nature may facilitate the simple substitution of selective ones of the panels 22 and door frame 18 to effect such modification of the enclosure 12. In order to secure any items 10 therein, it is obviously contemplated that the panels 22 and door frame 18 may not be readily disengaged from the exterior 26 of the enclosure 12 without suitable safeguards. The particular method of interlocking the panels 22 and door frame 18 may be chosen from those which are well known to one of ordinary skill in the art.

Figure 2:
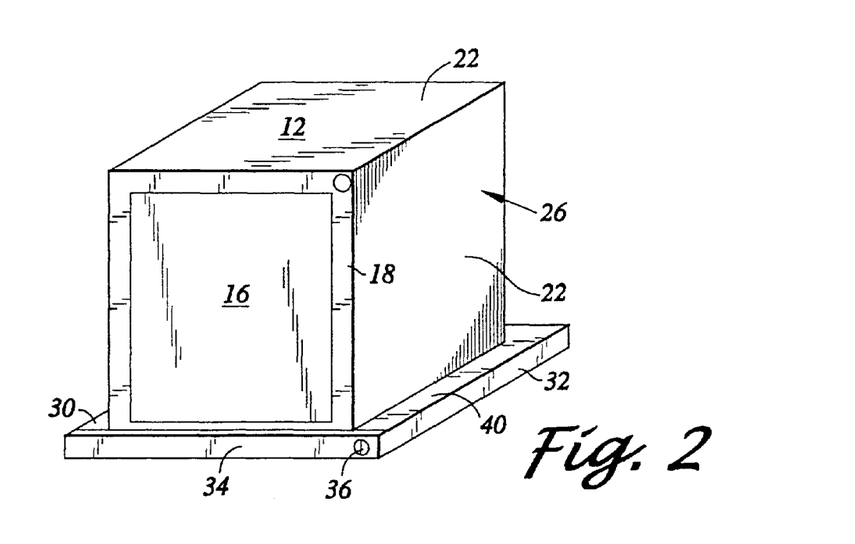
FIG. 2 depicts the enclosure of FIG. 1 shown locked in its docking bay.

Depending upon the users needs, the enclosure 12 may be formed to be mobile. In this respect, the enclosure 12 may be provided with a set of wheels 28 or a dolly. Thus, the enclosure 12 itself may be transported about. In addition, the enclosure 12 may be cooperatively used with a docking bay 30 for securely fastening the enclosure 12 in place, as depicted in FIGS. 1 and 2. The docking bay 30 may include a perimeter portion 32 with an attached hinged bay door 34. The docking bay 30 is sized and configured to receive the enclosure 12. The bay door 34 may be opened to allow for the enclosure 12 to be wheeled therein. Once the enclosure 12 is received by the perimeter portion 32, the bay door 34 is allowed to close in locked engagement with the perimeter portion 32 via a suitable lock 36, as depicted in FIG. 2. The docking bay 30 itself is secured in place by those methods which are well known to those of ordinary skill in the art, and may include the use of anchor bolts disposed interior of the perimeter portion 32 attaching it to the floor.

Further, the docking bay 30 and the exterior 26 of the enclosure 12 are cooperatively configured to engage one another to prevent disengagement (i.e., removed away from) while the bay door 34 is in its closed position. In this a regard, the exterior 26 may be provided with a lower ridge 38 thereof and the perimeter portion 32 may be provided with a perimeter lip 40. The perimeter lip 40 is sized and configured to overlap the lower ridge 38 for preventing the enclosure 12 from being lifted out of, and therefore disengaged from, the docking bay 30. Other suitable methods of preventing such disengagement may he chosen from those which are well known to one of ordinary skill in the art.

Figure 3:
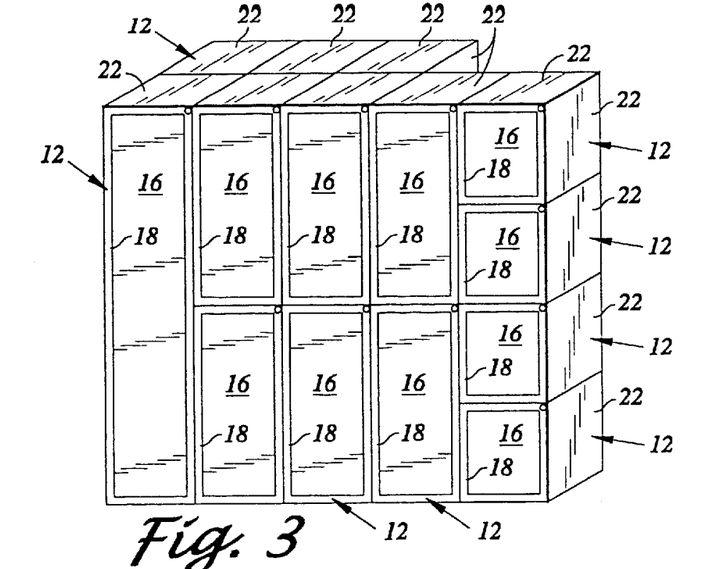
FIG. 3 depicted a grouping of multiple enclosures of another embodiment of the present invention.

In another embodiment of enclosure 12 as depicted in FIG. 3, the enclosure 12 may take the form of a plurality of such enclosures 12. The enclosures may be modular in design so as to facilitate selective grouping of any desired number of enclosures 12. In order to facilitate such modularity, the enclosures 12 may be formed to engage one another. In this regard, the panels 22 and door frame 18 of each enclosure 12 may be configured to engage those of another adjacent enclosure 12. Thus, a particular side of a particular panel 22 may define the interior 24 of one enclosure 12 and the exterior 26 of another enclosure 12. As storage needs increase, additional enclosures 12 may be constructed by adding additional panels 22, door frames 18 and doors 16. Further as storage need change, the existing enclosures 12 may be modified in size and configuration by selectively substituting particular ones of the panels 22, door frames 18 and doors 16.

Having thus described some of the general configuration features of the enclosure 12, attention is now recessed on the controlling of access to the interior 24 of the enclosure 12. The enclosure 12 is provided with a locking mechanism 42 for locking and unlocking the enclosure 12. Where the enclosure 12 is provided with the door 16 and door frame 18, the locking mechanism 42 facilitates locked engagement of the door 16 with the door frame 18. In the preferred embodiment of the present invention, the lock mechanism 42 is disposed within the door 16 as symbolically depicted in FIG. 1. It is contemplated, however, that he lock mechanism 42 may be configured to be integrated with the door frame 18. importantly, the lock mechanism 42 is controlled via an electrical signal. The lock mechanism 42 may take the form of a dead bolt which is driven by a solenoid device. Other suitable arrangements for the lock mechanism 42 may be chosen from those which are well known to one of ordinary skill in the art. As a safety feature, the lock mechanism 42 may be controlled from within the enclosure 12. For example, there may be provided a manual lever or a push button for unlocking the lock mechanism 42. It is contemplated that such safety latching techniques and hardware may be chosen from those which are well known to one of ordinary skill in the art.

As mentioned above, the transponder 14 includes programmable integrated circuity which has a memory for storing the item identification data. Referring now to the symbolic diagram of FIG. 4, in the one embodiment of the present invention, the storage system is provided with programming hardware 102 and associated software. The programming hardware 102 and associated software is configured to communicate with the transponder 14 for programming it with the item identification data and for storing corresponding selection criteria data. It is contemplated that a suitable configuration for the programming hardware 102 may be commercially available from any of those manufacturers mentioned above which manufacture the transponders 14 (e.g., Philips Semiconductors, Texas Instruments Incorporated, Microchip Technology, Inc. and Motorola, Inc.). It is contemplated that such programming may be initially effectuated at the time the transponder is constructed. In addition, such programming may be effectuated "on-the-fly" at some later time. In this regard, programming hardware 102 may be configured to establish a data link 104 with the transponder 14 for programming or updating the item identification data.

As discussed above, the controlled access storage system of the present invention is used with the item 10 tagged with the transponder 14 configured to transmit item identification data. The storage system is further provided with a transponder communications device 44. Preferably, the transponder communications device 44 is housed in the door 16. The transponder communications device 44 is configured to electrically interrogate the transponder 14 and to receive the item identification data in response. In this regard, the transponder communications device 44 is configured to establish a transponder data link 48 with the transponder 14, as symbolically illustrated in FIG. 4. A suitable configuration of the transponder communications device 44 may be commercially available from any manufacturer which manufactures the transponders 14 (e.g., Philips Semiconductors, Texas Instruments Incorporated, Microchip Technology, Inc. and Motorola, Inc.). As one of ordinary skill in the art will appreciate, the transponder data link 48 is established by bringing the transponder 14 in close proximity to the transponder communications device 44. More particularly, the transponder communications device 44 is configured to radiate an electromagnetic field, preferably a radio frequency field, to which the transponder 14 must be exposed. The distance at which the transponder data link 48 may be established is a function of many variables, such as the material type of the door 16 through which the field must penetrate. In this respect, it is desirable that the door 16 or at least the portion thereof adjacent the transponder communications device 44 is constructed of high strength plastic. Other significant variables impacting the distance at which the transponder data link 48 may be established includes the amount of energy transmitted by the transponder communications device 44 and the antenna size of the transponder 14.

Figure 5:
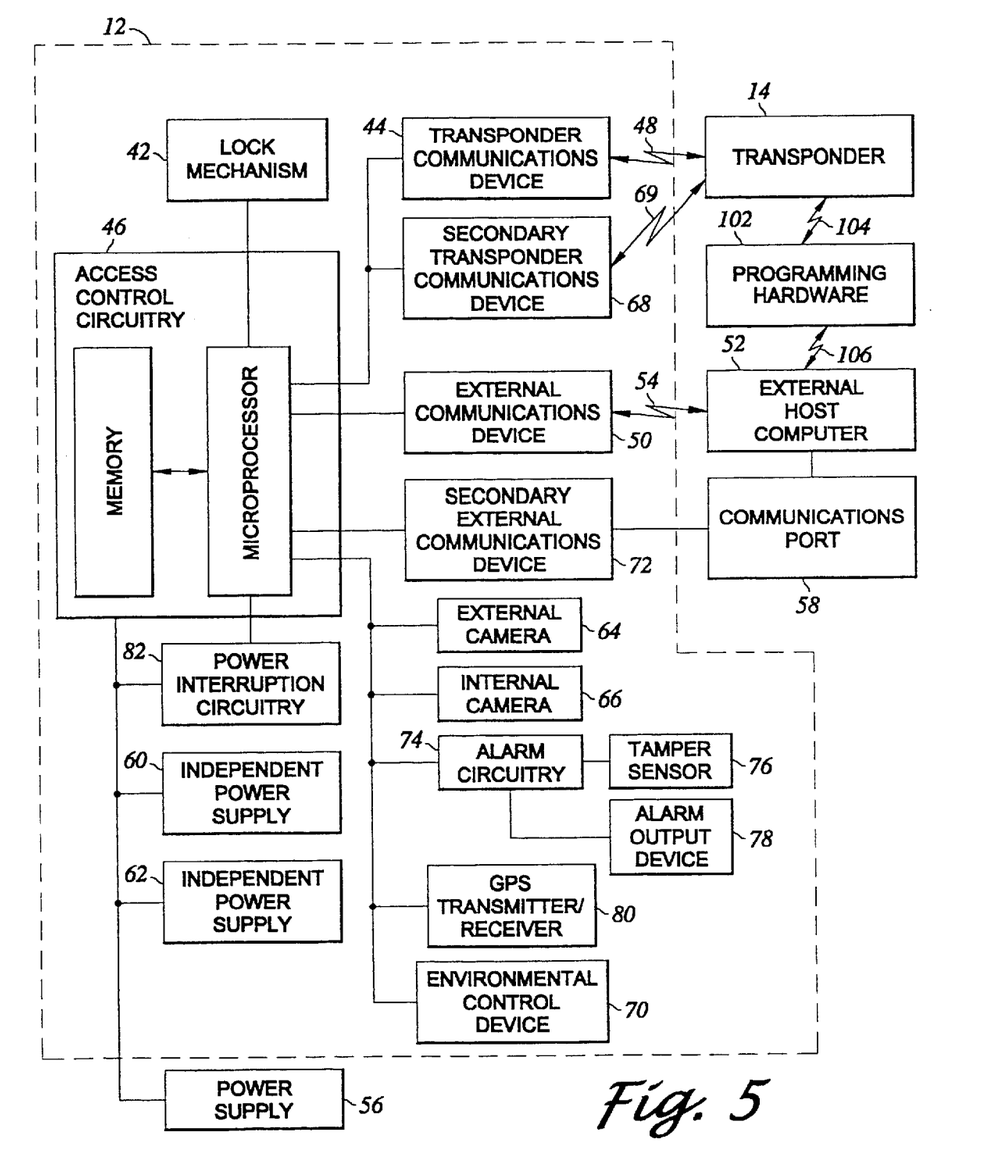
FIG. 5 is a symbolic schematic diagram of the present invention.

Referring now to the symbolic schematic diagram of FIG. 5, the control system is further provided with access control circuitry 46. The access control circuitry 46 is disposed in operable communication with the transponder communications device 44. The access control circuitry contains a microprocessor coupled with a memory device. In this regard, the access control circuitry 46 is configured to receive the item identification data from the transponder communications device 44 and stores it in its memory. The access control circuitry 46 has selection criteria data which is also stored in the memory. The access control circuitry 46 selectively provides an unlock. signal to the lock mechanism 42 in response to comparison of the selection criteria data to the item identification data. In this regard, the enclosure 12 may be primed to expect the delivery of a particular transponder tagged item 10 thereat. It is contemplated that the access control circuity 46 may be constructed and programmed according to those methods which are well known to one of ordinary skill in the art.

Thus, it is understood that the access control circuitry 46 controls the lock mechanism 42 and therefore controls access to the enclosure 12. As such, the present invention significantly recognizes that the transponder tagged item 10 itself may be used to trigger the operator of the lock mechanism 42. In practice, in order to unlock the enclosure 12, the transponder tagged item 10 need only be transported adjacent to the enclosure 12 so as to facilitate the transmission and receipt of the item identification data by the transponder communications device 44. As an additional security feature, the access control circuitry 46 may be configured or programmed to only provide the unlock signal once to prevent any subsequent unauthorized re-entry to the enclosure 12.

Preferably, the storage system of the present invention is provided with an external communications device 50 which is in electrical communication with the access control circuitry 46. The external communications device 50 is configured to establish a host computer data link 54 with an external host computer 52. In this respect, it is contemplated that the status of the enclosure 12 and any items 10 delivered thereto may be reported to the external host computer 52. The external communications device 50 may take the form of a cellular phone device, radio frequency transmitter/receiver or other transmitting electronic device. Advantageously, the external communications device 50 facilitates information to be remotely passed to the external computer 52 without the enclosure 12 having to be "hardwired." Thus, any dependency upon attached communications lines or cables is avoided. This is attractive from a security point of view in that the flow of communications to the external host computer 52 is not disrupted due to intentional or accidental damage to any attached communications lines or cables. This is also attractive from a logistics point of view where communications lines or cables are not readily available.

It is contemplated, however, that as a redundant complement to the external communications device 50, the access control circuitry 46 may be configured to communicate with the external host computer 52 via traditional communications lines or cables via a secondary external communications device 72. In this regard, the external communications device 72 is in electrical communications with the access control circuitry 46. For example, the external communications device 72 may take the form of a modem device which is configured to communicate across traditional telephone lines. Thus, the secondary external communications device 72 may be configured to electrically communicate with a telephone communications port 58, as is symbolically depicted in FIG. 1. As shown, the docking bay 30 is sized and positioned about the telephone communications port 58 so as to protect the communications link between the secondary external communications device 72 and the telephone communications port 58 from any intentional or accidental interruption.

Figure 4:
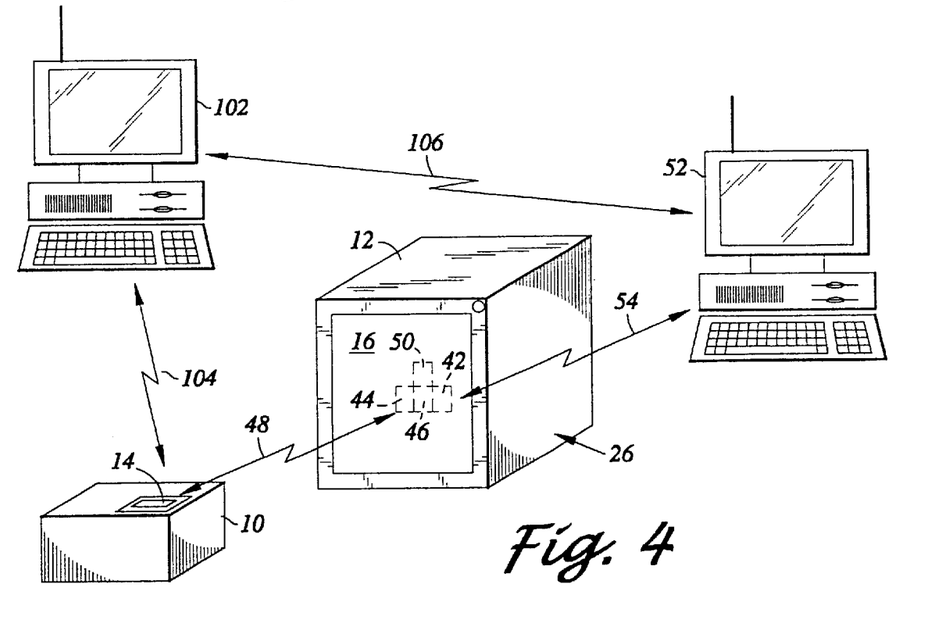
FIG. 4 symbolically depicts the communications relationship between the transponder, programming computer, enclosure and external host computer.

The external communications devices 50, 72 are configured to exchange data with the external host computer 52. It is contemplated that the data link with the external host computer 52 may be two-way and that signals may be passed to and from the access control circuitry 46. In this regard, as mentioned above, the storage system may be provided with the programming hardware 102 for programming the transponder 14 prior to the delivery of the same to the enclosure 12. Advantageously, subsequent to such programming, the programming hardware 102 may be configured to communicate the selection criteria data which corresponds to the item identification data to the external host computer 52. Such communication may be accomplished by establishing a data link 106 from the programming hardware 102 to the external host computer 52. In turn, the external host computer 52 may communicate the selection criteria data to the access control circuitry 46 at the enclosure 12 via the host computer data link 54.

Advantageously, the access control circuitry 46 may be configured to generate a signal which is representative of the event that a particular item 10 has arrived at the enclosure 12. In particular, when the item 10 is electronically sensed by the establishment of the transponder data link 48, the access control circuitry 46 may be triggered to generate a signal which includes such information as the time of such event, as well as, any of the item identification data received from the transponder 14. Concurrently, the access control circuitry 46 may also be triggered to generate a similar signal which is indicative to the time of arrival at the enclosure 12 which is transmitted to the programmable transponder 14 via the transponder communications device 44. Thus, the item identification data may be updated at the transponder 14 to document where and when the transponder 14 and item 10 have been. Further, as the transponder 14 may be programmed, the external host computer 52 may send signals which may then be used to update the item identification data contained within the transponder 14. For example, the transponder 14 may be updated with additional routing information allowing it to gain access to other enclosures.

As communication between the access control circuitry 46 and the external host computer 52 may be two-way, a signal may be generated and sent by the external host computer 52 to the access control circuitry 46 which triggers it to provide the unlock signal to the lock mechanism 42. Thus, access to the enclosure may be remotely controlled by the host computer 52. Thus, subsequent to the establishment of the transponder data link 48 and downloading of the item identification data, the access control circuitry 46, either one of the external communications devices 50, 72, may query the host computer 52 as to whether to unlock the enclosure 12 for such item 10.

Preferably, the external host computer 52 is in communication with a global computer network (e.g., the Internet). In this respect, any status information which is reported to the external host computer 52 regarding the enclosure and any items 10 delivered thereto may be made accessible. In practice, a sender or an expecting receiver of the item 10 may access information at the host computer by logging onto a web page associated with the host computer 52, for example. Thus, one may be able to find out if and when the item 10 has been delivered at an enclosure 12.

It is contemplated that the host computer 52 may take many forms, such as a data center which communicates and manages a multitude of similarly configured enclosures 12. Such a data center may even be linked with other such data centers to form a wide ranging network. Alternatively, the host computer 52 may be of a more limited nature, such as a PC, and reside within the receiver's home or office, for example.

In a preferred embodiment of the present invention, the storage system is provided with an independent or self contained power supply which is disposed in operable communication with the access control circuitry 46. For example, the power supply may be a solar powered device 60 which may include the use of solar panels attached to the exterior 26 of the enclosure 12 (symbolically depicted in FIG. 1). The independent power supply may take the form of a manual powered device 62 which may include a hand crank coupled to a mechanical spring, as also symbolically depicted in FIG. 1. In addition, the independent power supply may also include the use of a rechargeable battery operated device and combinations of such devices. The self contained power supply may act as a sole source where electrical power lines are not conveniently located or available, such as in remote areas. Alternatively, the independent power supply may act as a back up to a traditional electrical power line. Thus, the access control circuitry 46 and those devices in communication therewith may be configured to receive power from a power supply 56, as is symbolically depicted in FIG. 1. As shown, the docking bay 30 is sized and positioned about the power supply 56 so as to protect the power link from any intentional or accidental interruption.

As an added security feature, power interruption circuitry 82 may be provided which is in electrical communication with the access control circuitry 46 for sensing an interruption of power to the access control circuity 46. In addition, the power interruption circuitry 82 may be configured to generate a signal representative of sensed power interruption to the access control circuitry 46. The external communications devices 50, 72 may be configured to transmit such signal to the external host computer 52, thereby being notified of such power interruption event. It is contemplated that the methods of constructing and configuring the power interruption circuitry 82 are chosen from those which are well known to one of ordinary skill in the art.

The enclosure 12 may be further equipped with an external camera 64 which is sized and configured to capture an image adjacent the enclosure 12. The external camera 64 may generate an image signal representative of the captured image. The external camera 64 may be configured to provide the access control circuitry 46 with such signal which in turn may route the signal to either one of the external communications devices 50, 72 for transmission of the image signal to the external host computer 52. Thus, the external camera 64 may he configured to capture images of anyone possibly involved with tampering with the enclosure 12. Further, the external camera 64 may be useful in documenting the particular individual who may have delivered the item 10, as well as, confirming that the item 10 was indeed delivered.

In addition, the enclosure 12 may be further equipped with an internal camera 66 which is disposed within the interior 24 of the enclosure 12 for capturing image thereat. The internal camera 66 may generate an image signal representative of the captured image. The external camera 64 may be configured to provide the access control circuitry 46 with such signal which in turn may route the signal to either one of the external communications devices 50, 72 for transmission of the image signal to the external host computer 52. It is contemplated that such an arrangement may he useful in providing information to the host computer 52 as to the integrity of the delivered item 10.

In the preferred embodiment of the present invention, a secondary transponder communications device 68 may be disposed in electrical communication with the access control circuitry 46. The secondary transponder communications device 68 is configured to establish a secondary transponder data link 69 with the transponder 14. The secondary transponder communications device 68 is configured to electrically sense the transponder being within the enclosure. Thus, while the transponder communications device 44 is operably calibrated to "sense" the transponder 14 when it is disposed outside of the enclosure 12, the secondary transponder communications device 68 is calibrated to sense whether the transponder 14 is in the interior 24 of the enclosure 12. As one of ordinary skill in the art can appreciate, such calibration may be accomplished by establishing a threshold signal strength above which indicates the close proximity of the transponder 14. The access control circuitry 46 may be configured to generate a confirmation signal in response to the sensed presence of the transponder 14 by the secondary transponder communications device 68. The confirmation signal may be transmitted to the external host computer 52 via the external communications devices 50, 72. As such, the host computer 52 may be informed that not only has the transponder 14 arrived at the enclosure 14, but also that it has been delivered to the interior 24 thereof.

In order to enhance the security of the enclosure 12, the enclosure 12 may be equipped with tamper sensors 76 for sensing a tamper event (e.g., unauthorized opening of a door to the enclosure, substantial movement of the enclosure). The tamper sensors 76 may include a simple pin trigger device which is in operable communication with the door 16 for detecting the opening thereof. The tamper sensors 76 may further include a shock or motion detector as well. The tamper sensors 76 are in operable communication with alarm circuitry 74. The alarm circuitry 74 may be in operable communication with alarm output devices 78. Thus, the alarm circuitry 74 may be configured to trigger the alarm output devices 78, which may take the form of an audible siren or flashing lights, for example. The alarm circuitry 74, tamper sensors 76, and alarm output devices 78 may be chosen from those which are well known to one of ordinary skill in the art. In addition, the alarm circuitry 74 may be configured to generate an alarm signal which may be provided to the access control circuitry 46. The alarm signal may be reported to the external host computer 52 via either one of the external communications devices 50, 72 to any such sensed tamper event.

As yet a further security feature, a global positioning satellite (GPS) positioning signal receiver 80 may be disposed within the enclosure 12. The positioning signal receiver 80 may be configured to request and receive a GPS positioning signal which is then forwarded to the access control circuitry 46. The access control circuitry 46 is configured to route locational data based upon the GPS positioning signal to the secondary external communications device 72 for transmission to the host computer 52. Thus, in the contingency where the enclosure is stolen, the GPS positioning signal receiver 80 provides a means for tracking the location of the enclosure 12 and any of the valuable items 10 stored therein.

Furthermore, the enclosure may be provided with environmental control device 70 in operable communication with the access control circuitry 46 for modifying or maintaining the environment within the enclosure 12. Such environment modification or maintenance may include temperature, humidity and lighting, for example. This may be of particular importance where the items 10 are hot foods, dairy products, fresh flowers, produce, live animals, etc.

Figure 6:
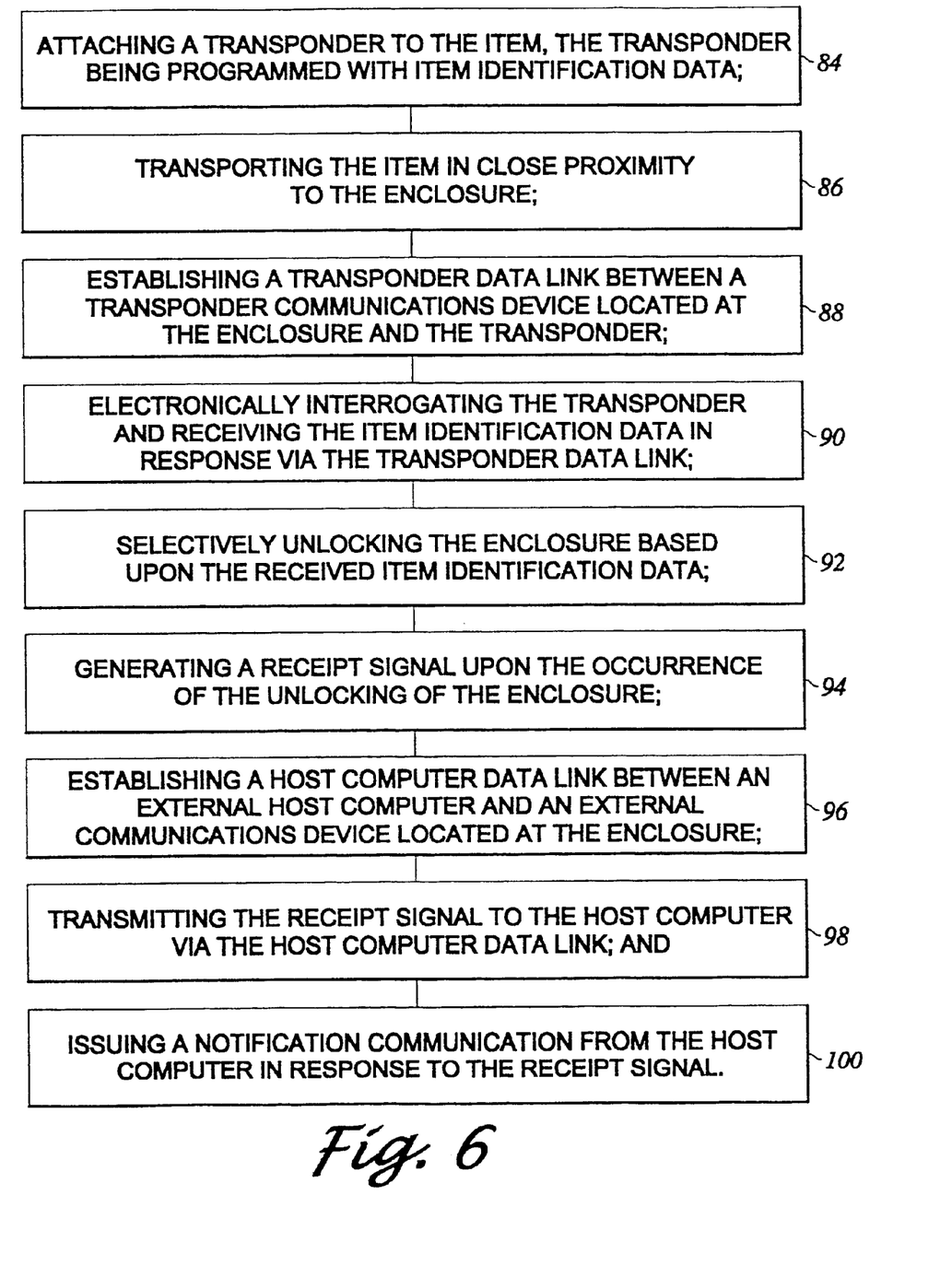
FIG. 6 is a symbolic flow chart of a method of another embodiment of the present invention.

In another embodiment of the present invention, there is provided a method of delivering an item to a looked enclosure. Where the item is desired to be securely delivered from a first entity (i.e., a sender) to a second entity (i.e., receiver), the above described storage system facilitates a method of securely delivering such item. Referring now to FIG. 6, there is depicted a flowchart of the steps of the delivery method of another embodiment of the present invention. The delivery method initially provides for the step of attaching 84 the transponder which is programmed with the item identification data to the item. The transponder tagged item is transported 86 in close proximity to the enclosure. A transponder data link is established 88 between the transponder communications device located at the enclosure and the transponder. Preferably, the transponder data link is established via radio frequency transmissions as discussed in detail above. The transponder is electrically interrogated and the item identification data is received 90 in response via the transponder data link. The enclosure is selectively unlocked 92 based upon the received item identification data.

In the preferred embodiment of the present invention, upon the occurrence of the unlocking of the enclosure a receipt signal is generated 94. A host computer data link may be established 96 between the external host computer and the external communications device located at the enclosure. Such host computer data link may take the form of transmissions such as via a cellular phone network or over certain radio frequencies. The receipt signal may be transmitted 98 to the host computer via the host computer data link. Subsequently, a notification communication may be issued 100 from the host computer in response to the receipt signal. Thus, the sender and receiver may be notified that the item has been delivered to the enclosure and is ready to be retrieved. The notification communication may be automatic and may take the form of any form of communication. For example, the notification communication may be sent via an electronic device and may thus take the form of an electronically generated E-mail via the Internet, a voice automated telephone call and message, an electronic page, or facsimile.

It is contemplated that once the transponder tagged item is deposited and locked within the enclosure, the enclosure may be subsequently unlocked by the receiver or other delivery personnel on behalf of the receiver for the pick-up of the item. The unlocking of the enclosure may be accomplished by any means in addition to being responsive to the transponder tagged item as discussed above. For example, the receiver or other delivery personnel on behalf of the receiver may be provided with another transponder which is configured to unlock the enclosure or the locking mechanism may be configured to additionally unlock in response to a mechanical key. Alternatively, the person picking up the item may contact the host computer for triggering the host computer to remotely unlock the enclosure. In this regard, the enclosure may be provided with a means for allowing direct communication with the host computer. Thus, the enclosure may be provided with an intercom system which is triggered by a push button switch to communicate with the host computer for gaining access thereto or for possibly reporting any problems that may arise associated with the enclosure. Such an intercom system may thus be in operable communications with the external communications device. It is contemplated that the present system may facilitate two-way voice, video and data communication. In addition, the external communications device may be configured to directly communicate with the expecting receiver of the item. Thus, upon delivery the delivery personnel may trigger a switch within the enclosure which responds by issuing a confirmatory communication to the expecting receiver that the item has been delivered. Moreover, such a switch may be used to alert the receiver of any problems that may arise associated with the enclosure, or that the receiver is needed at the enclosure (if the receiver is available).

In addition, once the transponder tagged item is retrieved from the enclosure, such removal of the item may be sensed (as discussed above in connection with the delivery system of the present invention). A signal may be sent to the host computer in response to such sensed event. Thereafter, a confirmation communication may be issued to the first entity (i.e., the sender) which confirms that indeed the item has been retrieved. It is contemplated that other information may be communicated in response to any number of events concerning the enclosure. As discussed above in connection with the delivery system of the present invention, other events and communications may relate to the occurrence of a tamper event or the interruption of power to the enclosure, for example.

As the transponder is programmable, the step of attaching 84 a transponder to the item may additionally include programming the transponder by establishing a data link between the transponder and the programming computer. Such "on-the-fly" programming allows for the item identification data to be updated or re-coded prior to being transported 86 to the enclosure. Prior to being transported 86 to the enclosure, it is contemplated that the transponder may be required to pass various check point locations. Such check point locations may represent opportunities to establish a data link. between the transponder and the programming computer for updating the item identification data while it is enroute to a particular enclosure. Such updating may be accomplished effectively transparent to any delivery person or vendor transporting the transponder tagged item. As one of ordinary skill in the art will be able to appreciate, this is advantageous as such on-the-fly updating mitigates against the effects of breaches in security with respect to the original item identification data. In addition, after the programming computer is used to program the transponder, corresponding selection criteria may be generated and communicated to the external host computer by establishing a data link therebetween. Once the external host computer is provided with the selection criteria data, it may be further communicated to the enclosure. In this regard, the selective unlocking 92 may be facilitated by comparison of the item identification data with selection criteria data.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A controlled access storage system for the delivery and retrieval of an item having a transponder associated therewith, the transponder being configured to transmit item identification data, the storage system comprising:

an enclosure sized and configured to store the item;

a locking mechanism for unlocking the enclosure for access therein in response to an unlock signal;

a transponder communications device configured to electrically interrogate the transponder and to receive the item identification data in response; and access control circuitry disposed in operable communication with the transponder communications device and the locking mechanism, for selectively providing an unlock signal to the locking mechanism in response to the received item identification data.

2. The controlled access storage system of claim 1 wherein the transponder is a passive radio frequency device.

3. The controlled access storage system of claim 1 wherein the transponder is integrated with a label attached to the item.

4. The controlled access storage system of claim 1 wherein the transponder is programmable for updating the item identification data.

5. The controlled access storage system of claim 4 wherein the transponder communications device is configured to transmit an electrical signal to the transponder for updating the item identification data.

6. The controlled access storage system of claim 1 further comprising:

an external communications device in electrical communication with the access control circuitry for transmitting a signal representative of the receipt of the item identification data to an external host computer.

7. The controlled access storage system of claim 6 wherein the external communications device is a modem.

8. The controlled access storage system of claim 6 wherein the external communications device is a cellular phone device.

9. The controlled access storage system of claim 6 wherein the external communications device is a radio frequency transmitter.

10. The controlled access storage system of claim I further comprising:

an external host computer; and an external communications device in electrical communication with the access control circuitry for transmitting a signal representative of the receipt of the item identification data to the external host computer.

11. The controlled access storage system of claim 10 wherein the external host computer is in communication with a global computer network.

12. The controlled access storage system of claim 1 further comprising:

an external communications device in electrical communication with the access control circuitry for transmitting the item identification data to an external host computer.

13. The controlled access storage system of claim I wherein the access control circuitry has selection criteria data stored therein, the access control circuitry selectively provides the unlock signal in response no comparison of the selection criteria data to the item identification data.

14. The controlled access storage system of claim 1 further comprising:

an external communications device in electrical communication with the access control circuitry for receiving selection criteria data from an external host computer;

wherein the access control circuitry selectively provides the unlock signal in response to comparison of the selection criteria data to the item identification data.

15. The controlled access storage system of claim 14 further comprising programming hardware configured to program the transponder with the item identification data and to generate the selection criteria data.

16. The controlled access storage system of claim 15 wherein the programming hardware is in electrical communication with the external host computer for communicating the section criteria data thereto.

17. The controlled access storage system of claim 1 further comprising:

an external communications device in electrical communication with the access control circuitry for receiving an override signal from an external host computer;

wherein the access control circuitry provides the unlock signal in response to receipt of the override signal.

18. The controlled access storage system of claim 1 further comprising:

a self contained power supply disposed in operable communication with the access control circuitry.

19. The controlled access storage system of claim 18 wherein the power supply is a solar powered device.

20. The controlled access storage system of claim 18 wherein the power supply is a manual powered device.

21. The controlled access storage system of claim 1 further comprises:

power interruption circuitry in electrical communication with the access control circuitry for sensing an interruption of power to the access control circuity and for generating a signal representative of sensed power interruption; and an external communications device in electrical communication with the access control circuitry for transmitting the signal representative of sensed power interruption to an external host computer.

22. The controlled access storage system of claim 1 further comprising:

a global positioning satellite (GPS) positioning signal receiver for receiving a GPS positioning signal attached to the enclosure; and an external communications device in electrical communication with the signal receiver for transmitting locational data based upon the received GPS positioning signal to an external host computer.

23. The controlled access storage system of claim 1 wherein the enclosure has an environmental control device for modifying the environment within the enclosure.

24. The controlled access storage system of claim 23 wherein the environmental control device is a heating device.

25. The controlled access storage system of claim 23 wherein the environmental control device is an air conditioning device.

26. The controlled access storage system of claim 23 wherein the environmental control device is a light source.

27. The controlled access storage system of claim 1 further comprises at least one tamper sensor in mechanical communication with the enclosure for sensing a tamper event, the access control circuitry generates an alarm signal in response to the sensed tamper event.

28. The controlled access storage system of claim 27 further comprises an external communications device in electrical communication with the access control circuitry for transmitting the alarm signal to an external host computer.

29. The controlled access storage system of claim 1 further comprises a camera sized and configured to capture an image adjacent the enclosure, the camera is in electrical communication with the access control circuitry.

30. The controlled access storage system of claim 29 wherein the camera generates an image signal representative of the captured image.

31. The controlled access storage system of claim 30 further comprises an external communications device in electrical communication with the access control circuitry for transmitting a signal representative of the image signal to an external host computer.

32. The controlled access storage system of claim 1 wherein the enclosure is mobile.

33. The controlled access storage system of claim 32 wherein the enclosure has wheels.

34. The controlled access storage system of claim 32 further comprises a docking bay sized and configured to engage the enclosure.

35. The controlled access storage system of claim 1 further comprises a secondary transponder communications device in electrical communication with the access control circuitry, the secondary transponder communications device is configured to electrically sense the transponder being within the enclosure, the access control circuitry generates a confirmation signal in response to the sensed presence of the transponder.

36. The controlled access storage system of claim 35 further comprises an external communications device in electrical communication with the access control circuitry for transmitting the confirmation signal to an external host computer.

37. The controlled access storage system of claim 1 wherein the enclosure is formed of a plurality of modular panels.

38. The controlled access storage system of claim 1 wherein the enclosure is sized and configured to engage another similarly sized and configured enclosure.

39. A controlled access storage system for the delivery and retrieval of an item having a transponder associated therewith, the transponder being configured to transmit item identification data, the storage system comprising:
   an enclosure sized and configured to store the item;
   a locking mechanism for unlocking the enclosure for access therein in response to an unlock signal;
   a transponder communications device configured to electrically interrogate the transponder and to receive the item identification data in response;
   access control circuitry disposed in operable communication with the transponder communications device and the locking mechanism, for selectively providing an unlock signal to the locking mechanism in response to the received item identification data;
   an external host computer; and
   an external communications device in electrical communication with the access control circuitry for transmitting a signal representative of the receipt of the item identification data to the external host computer.

40. The controlled access storage system of claim 39 wherein the external communications device is a modem.

41. The controlled access storage system of claim 39 wherein the external communications device is a cellular phone device.

42. The controlled access storage system of claim 39 wherein the external communications device is a radio frequency transmitter.

43. The controlled access storage system of claim 39 wherein the external host computer is in communication with a global computer network.

44. The controlled access storage system of claim 39 wherein the external communications device is configured to transmit the item identification data to the external host computer.

45. The controlled access storage system of claim 39 wherein the external communications device is configured to receive selection criteria data from the external host computer, the access control circuitry selectively provides the unlock signal in response to comparison of the received selection criteria data to the item identification data.

46. The controlled access storage system of claim 39 wherein the external communications device is configured to receive an override signal from an external host computer, the access control circuitry provides the unlock signal in response to receipt of the override signal.

47. The controlled access storage system of claim 39 further comprises power interruption circuitry in electrical communication with the access control circuitry for sensing an interruption of power to the access control circuity and for generating a signal representative of sensed power interruption, wherein the external communications device is configured to transmit the signal representative of sensed power interruption to the external host computer.

48. The controlled access storage system of claim 39 further comprising a global positioning satellite (GPS) positioning signal receiver for receiving a GPS positioning signal attached to the enclosure, the external communications device is configured to transmit locational data based upon the received GPS positioning signal to an external host computer.

49. The controlled access storage system of claim 39 further comprises at least one tamper sensor in mechanical communication with the enclosure for sensing a tamper event, the access control circuitry generates all alarm signal in response to the sensed tamper event, the external communications device is configured to transmit the alarm signal to the external host computer.

50. The controlled access storage system of claim 39 further comprises a camera sized and configured to generate an image signal representative of an image adjacent the enclosure, the camera is in electrical communication with the access control circuitry, the external communications device is configured to transmit the signal representative of the image signal to the external host computer.

51. The controlled access storage system of claim 39 further comprises a secondary transponder communications device in electrical communication with the access control circuitry, the secondary transponder communications device is configured to electrically sense the transponder being within the enclosure, the access control circuitry generates a confirmation signal in response to the sensed presence of the transponder, the external communications device is configured to transmit the confirmation signal to the external host computer.

52. A controlled access storage system for the delivery and retrieval of items each having a transponder associated therewith, the transponder being configured to transmit item identification data, the storage system comprising:
   a plurality of enclosures sized and configured to store the items;
   a locking mechanism for unlocking the enclosures for access therein in response to an unlock signal;
   a transponder communications device configured to electrically interrogate the transponder and to receive the item identification data in response; and
   access control circuitry disposed in operable communication with the transponder communications device and the locking mechanism, for selectively providing an unlock signal to the locking mechanism in response to the received item identification data.

53. The controlled access storage system of claim 52 wherein the enclosures are sized arid configured to engage one another.

54. A method of delivering an item to a locked enclosure, the method comprising the steps of:
- (a) attaching a transponder to the item, the transponder being programmed with item identification data;
- (b) transporting the item in close proximity to the enclosure;
- (c) establishing a transponder data link between a transponder communications device located at the enclosure and the transponder;
- (d) electrically interrogating the transponder and receiving the item identification data in response via the transponder data link; and
- (f) selectively unlocking the enclosure based upon the received item identification data.

55. The method of delivering an item of claim 54 wherein step (a) the transponder is programmed by establishing a data link between the transponder and programming hardware.

56. Tho method of delivering an item of claim 55 wherein step (a) selection criteria data is generated by the programming hardware.

57. The method of delivering an item of claim 56 wherein the selection criteria data is communicated to the external host computer.

58. The method of delivering an item of claim 57 wherein step (f) the unlocking is based upon comparison of the selection criteria data to the received item identification data.

59. The method of delivering an item of claim 54 wherein step (c) the transponder data link comprises radio frequency transmissions.

60. The method of delivering an item of claim 54 further comprises the steps of:
- (g) generating a receipt signal upon the occurrence of the unlocking of the enclosure;
- (h) establishing a host computer data link between an external host computer and an external communications device located at the enclosure; and
- (i) transmitting the receipt signal to the host computer via the host computer data link.

61. The method of delivering an item of claim 60 wherein step (h) the host computer data link comprises radio frequency transmissions.

62. The method of delivering an item of claim 60 wherein step (h) the host computer data link comprises cellular phone transmissions.

63. The method of delivering an item of claim 59 further comprises the step of:
- (j) issuing a notification communication from the host computer in response to the receipt signal.

64. The method of delivering an item of claim 63 wherein the notification communication is sent via an electronic device.

65. The method of delivering an item of claim 64 wherein the electronic device is a telephone.

66. The method of delivering an item of claim 64 wherein the electronic device is a global computer network.

67. The method of delivering an item of claim 59 wherein step (i) further comprises accessing data representative of the receipt signal at the host computer.

* * * * *